(12) United States Patent
Uemura

(10) Patent No.: US 6,873,581 B2
(45) Date of Patent: Mar. 29, 2005

(54) SEMICONDUCTOR LASER DEVICE AND OPTICAL PICKUP APPARATUS

(75) Inventor: Hiroki Uemura, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 467 days.

(21) Appl. No.: 09/994,190

(22) Filed: Nov. 26, 2001

(65) Prior Publication Data

US 2002/0064107 A1 May 30, 2002

(30) Foreign Application Priority Data

Nov. 27, 2000 (JP) ........................................ 2000-359446

(51) Int. Cl.⁷ .......................... G11B 7/13; G11B 7/135
(52) U.S. Cl. ............................ 369/44.42; 369/112.07
(58) Field of Search ....................... 369/44.42, 112.07

(56) References Cited

U.S. PATENT DOCUMENTS

| | | | | | |
|---|---|---|---|---|---|
| 4,665,310 A | * | 5/1987 | Heemskerk | ............... | 369/44.12 |
| 4,835,378 A | * | 5/1989 | Coops | ..................... | 250/201.5 |
| 5,202,869 A | * | 4/1993 | Miyake et al. | ........... | 369/44.23 |
| 5,579,298 A | * | 11/1996 | Opheij et al. | ........... | 369/112.04 |
| 5,956,302 A | * | 9/1999 | Maeda et al. | ............. | 369/44.23 |
| 6,125,087 A | * | 9/2000 | Ohnishi et al. | .......... | 369/44.23 |
| 6,407,973 B1 | * | 6/2002 | Ophey | ................... | 369/112.07 |

FOREIGN PATENT DOCUMENTS

| | | |
|---|---|---|
| JP | 02-058738 | 2/1990 |
| JP | 02-166630 | 6/1990 |
| JP | 02-179936 | 7/1990 |
| JP | 06-274904 | 9/1994 |
| JP | 07073499 A | 3/1995 |
| JP | 11-025499 | 1/1999 |
| JP | 11-213441 | 8/1999 |
| JP | 11-219529 | 8/1999 |

OTHER PUBLICATIONS

International Office Action mailed Jun. 8, 2004, for Japanese Patent Application No. 2000–359446 filed Nov. 27, 2000, five pages.

Japanese Office Action mailed Aug. 24, 2004, for Japanese Patent Application Number 2000–359446 filed Nov. 27, 2000, four pages.

* cited by examiner

Primary Examiner—William Klimowicz
Assistant Examiner—Michael V. Battaglia
(74) Attorney, Agent, or Firm—Morrison & Foerster LLP

(57) ABSTRACT

The semiconductor laser device includes a signal light diffraction grating, and a light receiving portion having a pair of photodiodes extending as two strips with a parting portion or a zonal gap interposed therebetween and receiving a focus error detecting beam from the signal light diffraction grating. The light receiving portion is arranged such that its longitudinal direction is orthogonal to the direction of diffraction grooves of the signal light diffraction grating. The pair of photodiodes is arranged such that a spot of the focus error detecting beam moves, due to temperature changes, in a range essentially limited to the parting portion therebetween. Thus, a semiconductor laser device and an optical pickup apparatus suppressing focus errors due to temperature changes and preventing reduction in signal strength can be obtained.

5 Claims, 6 Drawing Sheets

SEMICONDUCTOR LASER DEVICE AND OPTICAL PICKUP APPARATUS

BACKGROUND OF THE INVENTION

1. Field of the Invention

The present invention relates to semiconductor laser devices for use in optical pickup apparatuses utilizing laser light, and more particularly to a semiconductor laser device used in an optical pickup apparatus for CD (Compact Disc), CD-ROM (Read Only Memory), MD (Memory Disc), CD-R (Readable CD) or the like.

2. Description of the Background Art

Information is read out of an information recording medium like a CD by means of a mechanism as shown in FIG. 4A. Laser light emitted from a semiconductor laser chip 122 is diffracted by a tracking beam generating diffraction grating 123 into a plurality of beams. The beams thus generated pass through an optical-path refracting diffraction grating (signal light diffraction grating) 124 from behind, and are collimated by a collimator lens 125. An objective 126 focuses the parallel beams on a disc 127 having digital information written thereon, which disc reflects the beams. The reflected beams including the information written on disc 127 therein follow the reverse course from objective 126 to collimator lens 125. They are then diffracted by signal light diffraction grating 124, and received by photodiodes D1–D5 constituting a light receiving portion 121. As shown in FIG. 4B, tracking beam generating diffraction grating 123 and signal light diffraction grating 124 are normally provided on lower and upper surfaces, respectively, of a hologram 120 being a transparent member. Signal light diffraction grating 124 is formed of two gratings: a fine grating 124a having diffraction grooves of smaller pitches and a coarse grating 124b having diffraction grooves of larger pitches.

Light receiving portion 121 is formed of a plurality of photodiodes D1, D2, D3, D4 and D5, as shown in FIGS. 5A, 5B and 5C. A beam is adjusted such that it is focused right on a signal track of a CD or the like and that the reflected beam falls on a focused point where it achieves focus on the light receiving portion. Herein, deviation of the beam spot from this focused point is called a focus error. FIG. 5A shows a case where the focus error occurs as the light receiving portion is too far from hologram 120, so that signal strength Id2 at photodiode D2 is too strong. FIG. 5C shows a case where the focus error occurs because the light receiving portion is too close to hologram 120, so that signal strength Id3 at photodiode D3 is too strong. These photodiodes D2 and D3 constitute a pair of photodiodes for use in detecting a focus error signal, separated from each other by a parting portion interposed therebetween. FIG. 5B shows a focused state with no focus error, in which case the beam spot is formed right on the parting portion between focus error signal detecting photodiodes D2 and D3. Although this parting portion may be a zonal boundary having a prescribed width, it is herein called a parting line 105 for convenience. When the signal strength (I) at each photodiode is represented with the corresponding reference character added thereto, signal strengths of regenerative signal RF, focus error signal FES and tracking signal RES are expressed as follows:

$RF=Id2+Id3+Id4$ $FES=Id2-Id3$ $RES=Id1-Id5.$

The reflected beam does not always form a spot on the focused point, due to a temperature change or other reasons. The focus error will be prevented if the beam spot moves, during the detection of the focus error signal, on light receiving portion 121 within the region of parting line 105. Since the focus error signal is obtained by Id2–Id3 as described above, it remains zero as long as the beam spot moves within the region of parting line 105 between photodiodes D2 and D3, and no finite focus error signal will be generated. If there is a temperature change, however, the beam spot 111c would move across photodiode D2 or D3, as shown in FIG. 6B, in which case the focus error signal would have a substantial absolute value. In order to suppress such a focus error due to the temperature change, it is necessary to maintain the focus error signal at zero despite the displacement of beam spot 111c. This can be done if the light receiving portion is arranged such that the beam spot moves within the parting line region 105 in accordance with the temperature change. In the case where beam 111 is deflected to fall on either one of focus error signal detecting photodiodes D2 and D3, the focus error signal FES takes a finite value, since FES=Id2–Id3, so that the focus error is detected.

A major factor causing such a focus error is a temperature change. In general, wavelength of the laser light emitted from a semiconductor laser chip changes in accordance with the temperature change. More specifically, the wavelength becomes longer as the temperature increases, and it becomes shorter as the temperature decreases. The configuration shown in FIG. 4A includes two diffraction gratings: tracking beam generating diffraction grating 123 and signal light diffraction grating 124. If the diffraction angle is represented as θ, the wavelength λ and the diffraction grating pitch d, then sin θ=λ/d in these diffraction gratings. It means that, as the wavelength λ changes, the diffraction angle θ changes correspondingly. Even a slight change in temperature would alter the diffraction angle of the laser beam, which causes the beam spot to diverge on the light receiving portion, resulting in a focus error. A laser beam emitted from semiconductor laser chip 122 is diffracted twice before reaching light receiving portion 121, by tracking beam generating diffraction grating 123 and signal light diffraction grating 124, and suffers the focus error due to the temperature change at each diffraction. Normally, tracking beam generating diffraction grating 123 and signal light diffraction grating 124 are arranged such that their directions of diffraction are orthogonal to each other.

FIG. 6A is a top plan view showing a two-dimensional arrangement of conventional light receiving portion 121 and hologram 120 of the optical pickup apparatus shown in FIG. 4A. The beams are aligned such that respective beam spots 111a–111f are formed approximately at the center portions of corresponding photodiodes, except that beam spot 111c is formed on parting line 105 separating focus error signal detecting photodiodes D2 and D3 from each other. Conventionally, parting line 105 has been arranged with a slope, on the order of 10 to 20 mrad, directed from the fine grating 124a side to the coarse grating 124b side as it becomes farther from hologram 120. Photodiode D4 has been arranged with a slope such that its long side extends in an opposite direction from that of the parting line, i.e., from the coarse grating 124b side toward the fine grating 124a side as the distance from hologram 120 increases. FIG. 7 shows measurements of the focus errors with respect to the temperature changes with this arrangement of FIG. 6A. It shows that the amount of the focus error increases in accordance with the temperature increase.

The arrows in FIG. 6B show the directions in which respective beam spots would move in accordance with the temperature change. Conventionally, the light receiving portion itself has been arranged at a certain angle, as shown in FIG. 6C, to make the beam 111c move along parting line 105 when a temperature change occurs. This arrangement can restrict the focus error due to the temperature change.

With this arrangement of the light receiving portion in FIG. 6C, however, some of the beam spots contributing to tracking error signal (RES) and others would deflect from the corresponding photodiodes due to the temperature change. For example, two beam spots 111a and 111e will not fall on the corresponding photodiodes D1 and D5, respectively, thereby weakening the relevant signal. As such, there has been a strong demand for development of a semiconductor device and a pickup apparatus that can restrict a focus error due to a temperature change and prevent reduction in strength of respective signals.

SUMMARY OF THE INVENTION

An object of the present invention is to provide a semiconductor laser device that can suppress, with simple means, a focus error due to a temperature change and prevent reduction of signal strength, and an optical pickup apparatus using the semiconductor laser device.

The semiconductor laser device according to an aspect of the present invention includes: a semiconductor laser chip which emits a laser light; a tracking beam generating diffraction grating which diffracts the laser light to generate a tracking beam; and a signal light diffraction grating which diffracts a signal light that is the laser light reflected from an optical disc. The semiconductor laser device further includes a light receiving portion having a pair of focus error detecting photodiodes that extends as two strips with a parting portion or a zonal gap interposed therebetween and receives a focus error detecting beam among a plurality of beams diffracted by the signal light diffraction grating. In this semiconductor laser device, the light receiving portion is arranged such that, as seen in two dimensions, a longitudinal direction thereof is orthogonal to the direction of diffraction grooves of the signal light diffraction grating. The pair of focus error detecting photodiodes is arranged such that a spot of the focus error detecting beam on the light receiving portion moves, due to a temperature change, in a range substantially limited within a region of the parting portion.

With such an arrangement, even if a temperature changes, the focus error detecting beam is received only within the gap forming the parting portion between the pair of photodiodes, whereby the focus error due to the temperature change is suppressed. In addition, the entire light receiving portion is arranged to extend orthogonal to the direction in which the diffraction grooves of the signal light diffraction grating extend. This ensures reception of the beams other than the focus error detecting beam, enabling sensitive reading of the corresponding signals. It should be noted that the temperature changes described herein refer to those attributable to changes in working environment, including seasonal changes. They do not include a temperature change of a large scale due to an accident or the like.

The semiconductor laser device according to another aspect of the present invention includes: a semiconductor laser chip which emits a laser light; a tracking beam generating diffraction grating which diffracts the laser light to generate a tracking beam; and a signal light diffraction grating which diffracts a signal light being the laser light reflected from an optical disc. The signal light diffraction grating includes a first diffraction grating provided with diffraction grooves of a pitch and a second diffraction grating provided with diffraction grooves of another pitch that is smaller than the pitch of the diffraction grooves of the first diffraction grating. The diffraction grooves of the first and second diffraction gratings extend in a common direction, and the first and second diffraction gratings are arranged adjacent to each other with a portion interposed therebetween that extends in a direction orthogonal to the common direction of the diffraction grooves. The semiconductor laser device further includes a light receiving portion having a pair of focus error detecting photodiodes which extends as two strips with a zonal gap forming a parting portion interposed therebetween and receives, of a plurality of beams diffracted by the signal light diffraction grating, a focus error detecting beam diffracted by the second diffraction grating. The light receiving portion is arranged such that, as seen in two dimensions, a longitudinal direction thereof is orthogonal to the common direction of the diffraction grooves of the signal light diffraction grating. In this semiconductor laser device, the parting portion is sloped, as seen in two dimensions, from the first diffraction grating side toward the second diffraction grating side as it extends farther away from the signal line diffraction grating.

The tracking beam generating diffraction grating and the signal light diffraction grating (for refracting an optical-path) are arranged orthogonal to each other as seen in two dimensions. The beam spot formed on the light receiving portion moves due to the temperature change, because the beam first suffers deviation in diffraction direction at the tracking beam generating diffraction grating, and after modulated by the objective or the like and reflected by the optical disc, it suffers deviation in diffraction direction again at the signal light diffraction grating. If the beam suffered the deviation in diffraction direction only at the signal light diffraction grating, the beam spot would deflect approximately parallel to the direction orthogonal to the diffraction grooves of the signal light diffraction grating. In practice, however, the beam suffers the deviation in diffraction direction also at the tracking beam generating diffraction grating, as described above. Thus, the beam spot moves along the direction at an angle with the direction orthogonal to the diffraction grooves. More specifically, the focus error detecting beam is diffracted by the fine grating (second diffraction grating) with diffraction grooves of small pitches, and forms a spot on the light receiving portion that moves, due to the temperature change, with a slope directed from the first diffraction grating side to the second diffraction grating side as the distance from the diffraction grating increases. Thus, by arranging the zonal gap of the parting portion with the identical slope, it becomes possible to restrict the focus error due to the temperature change only at the cost of a minimal space therefor. The parting portion as the boundary between the first and second diffraction gratings that intersects the common direction of the diffraction grooves is not limited to a straight or curved line; it may be a zonal region.

In either aspect described above, the pair of focus error detecting photodiodes preferably has an outer shape in two dimensions of a parallelogram which has a long side parallel to the longitudinal direction of the parting portion and a short side parallel to the direction of the diffraction grooves of the signal light diffraction grating as seen in two dimensions.

With such a structure, compact arrangement of the pair of focus error detecting photodiodes including the gap therebetween is enabled. Since the area of the light receiving portion is reduced, the frequency response characteristic is improved.

Preferably, in either aspect described above, the light receiving portion includes, besides the pair of focus error detecting photodiodes, other photodiodes that are arranged such that the longitudinal directions thereof are orthogonal to the direction of the diffraction grooves of the signal light diffraction grating as seen in two dimensions.

The pattern of photodiodes whose longitudinal directions are orthogonal to the diffraction grooves of the signal light diffraction grating is easy to form, thereby facilitating the fabrication of the light receiving portion. The other photodiodes may include a regenerative signal detecting photodiode and a track signal detecting photodiode.

Preferably, in either aspect described above, the plurality of beams diffracted by the signal light diffraction grating includes a track signal detecting beam, and the light receiving portion further includes a track signal detecting photodiode that receives the track signal detecting beam. The track signal detecting photodiode has its longitudinal direction orthogonal to the direction of the diffraction grooves of the signal light diffraction grating as seen in two dimensions.

The pattern formation of the photodiodes is simplified by arranging the longitudinal direction of the track signal detecting photodiode orthogonal to the direction of the diffraction grooves of the signal light diffraction grating.

Preferably, in either aspect described above, the plurality of beams diffracted by the signal light diffraction grating further include a regenerative signal detecting beam, and the light receiving portion further includes a regenerative signal detecting photodiode that receives the regenerative signal detecting beam. The regenerative signal detecting photodiode forms a parallelogram, in two dimensions, which has its long side sloped in a same direction as the long side of the focus error detecting photodiodes, and a short side in parallel with the direction of the diffraction grooves of the signal light diffraction grating.

With such an arrangement, the area of the light receiving portion can be reduced, which contributes to downsizing of the entire device as well as improvement of the frequency response characteristic.

Preferably, in either aspect described above, the pair of focus error detecting photodiodes and the regenerative signal detecting photodiode include respective regions in which respective spots formed by the focus error detecting beam and the regenerative signal detecting beam move in a working temperature range.

With such a structure, reception of the signals is ensured despite the temperature change. If the photodiodes each have the smallest possible size, especially the shortest possible length in the longitudinal direction, that covers the range in which the corresponding spot moves within the working temperature range, then the light receiving portion can be formed compactly, contributing to downsizing of the entire device.

The optical pickup apparatus according to the present invention optically reads information written on an optical disc employing the semiconductor laser device according to either one of the above-described aspects of the present invention.

With such a structure, an optical pickup apparatus provided with a compact light receiving portion suppressing a focus error due to a temperature change can be obtained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A–5C schematically show photodiodes in the light receiving portions and beam spots formed thereon, wherein FIG. 5A shows a case where the light receiving portion is too far from the signal light diffraction grating, FIG. 5B shows a case where right focus is obtained, and FIG. 5C shows a case where the light receiving portion is too close to the signal light diffraction grating.

DESCRIPTION OF THE PREFERRED EMBODIMENTS

Hereinafter, embodiments of the present invention will be described with reference to the drawings.

Figure 1A:
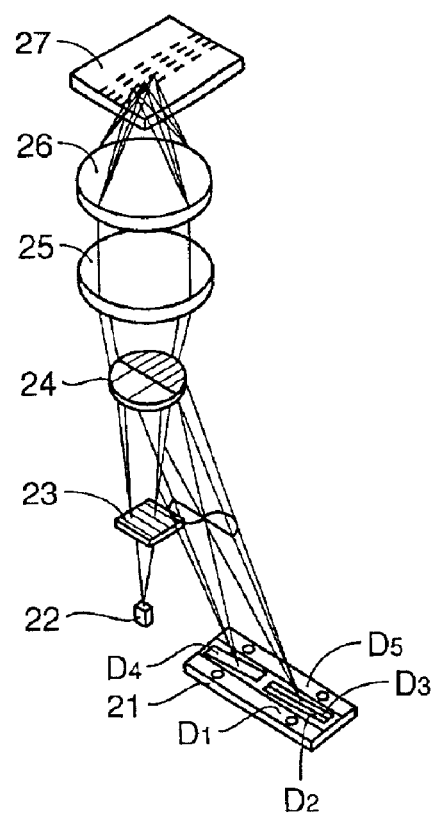
FIG. 1A shows an entire arrangement of optical elements of the semiconductor laser device according to an embodiment of the present invention.
Figure 1B:
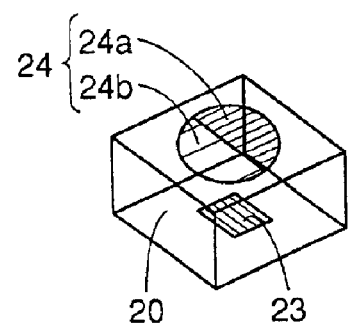
FIG. 1B shows, in perspective, a structure of the hologram in the semiconductor laser device of FIG. 1A.
Figure 4A:
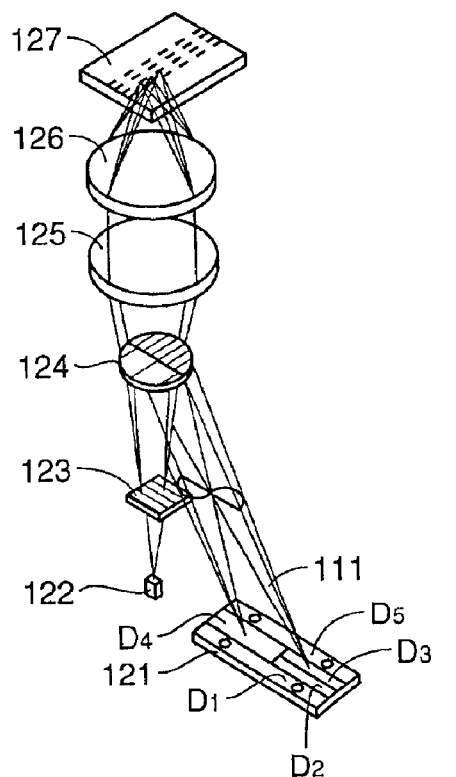
FIG. 4A shows an entire arrangement of the optical elements of the conventional semiconductor laser device.
Figure 4B:
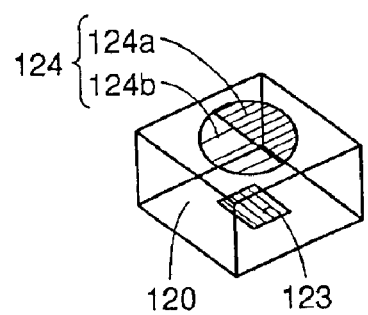
FIG. 4B shows, in perspective, the hologram in the semiconductor laser device of FIG. 4A.
Figure 5A:
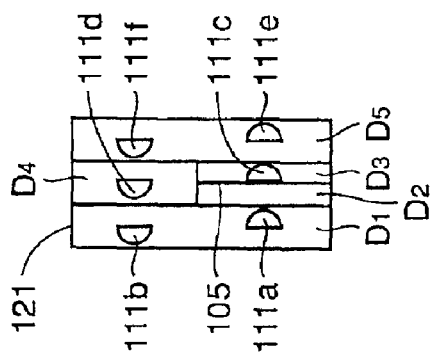
Figure 5B:
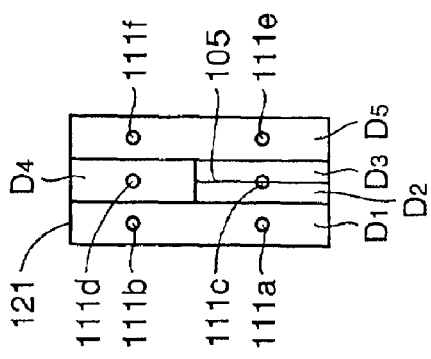
Figure 5C:
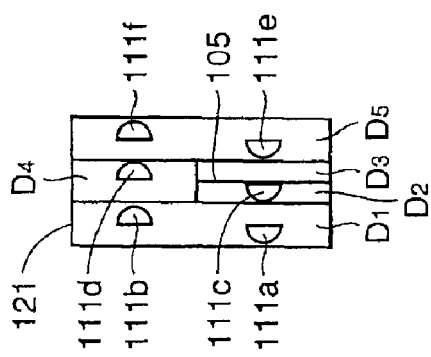
Figure 6A:
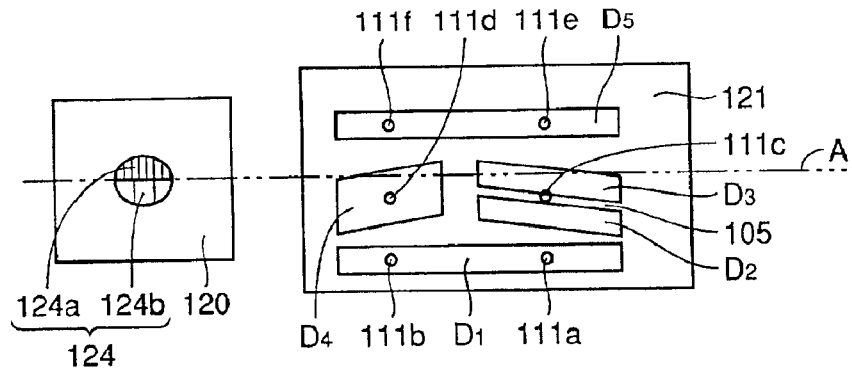
FIG. 6A is a top plan view showing the signal light diffraction grating and the light receiving portion with the beam spots formed at normal positions in the prior art.
Figure 6B:
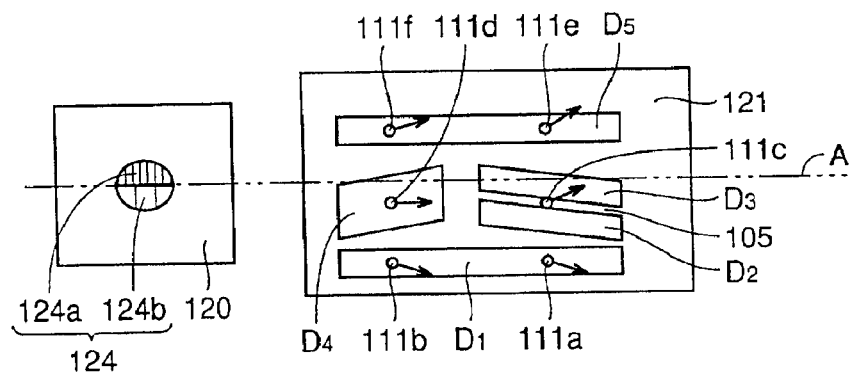
FIG. 6B shows directions in which the beam spots in FIG. 6A move due to a temperature change.
Figure 6C:
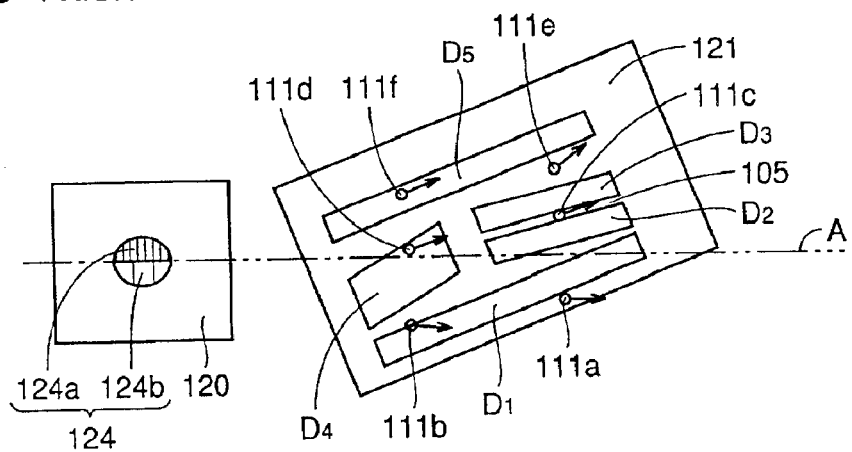
FIG. 6C shows an arrangement of the light receiving portion conventionally employed to prevent a focus error due to the temperature change.

FIGS. 1A and 1B show an embodiment of the semiconductor laser device according to the present invention, which is identical to the conventional semiconductor laser device as shown in FIGS. 4A and 4B except for the structure of the light receiving portion 21. A large focus error due to a temperature change occurs on the light receiving portion, because of a change in wavelength of the laser light emitted from semiconductor laser chip 22 in accordance with the temperature change, and because of deviations in diffraction directions of tracking beam generating diffraction grating 23 and signal light diffraction grating (or optical-path refracting diffraction grating) 24 in accordance with the change in wavelength of the laser light.

Figure 2:
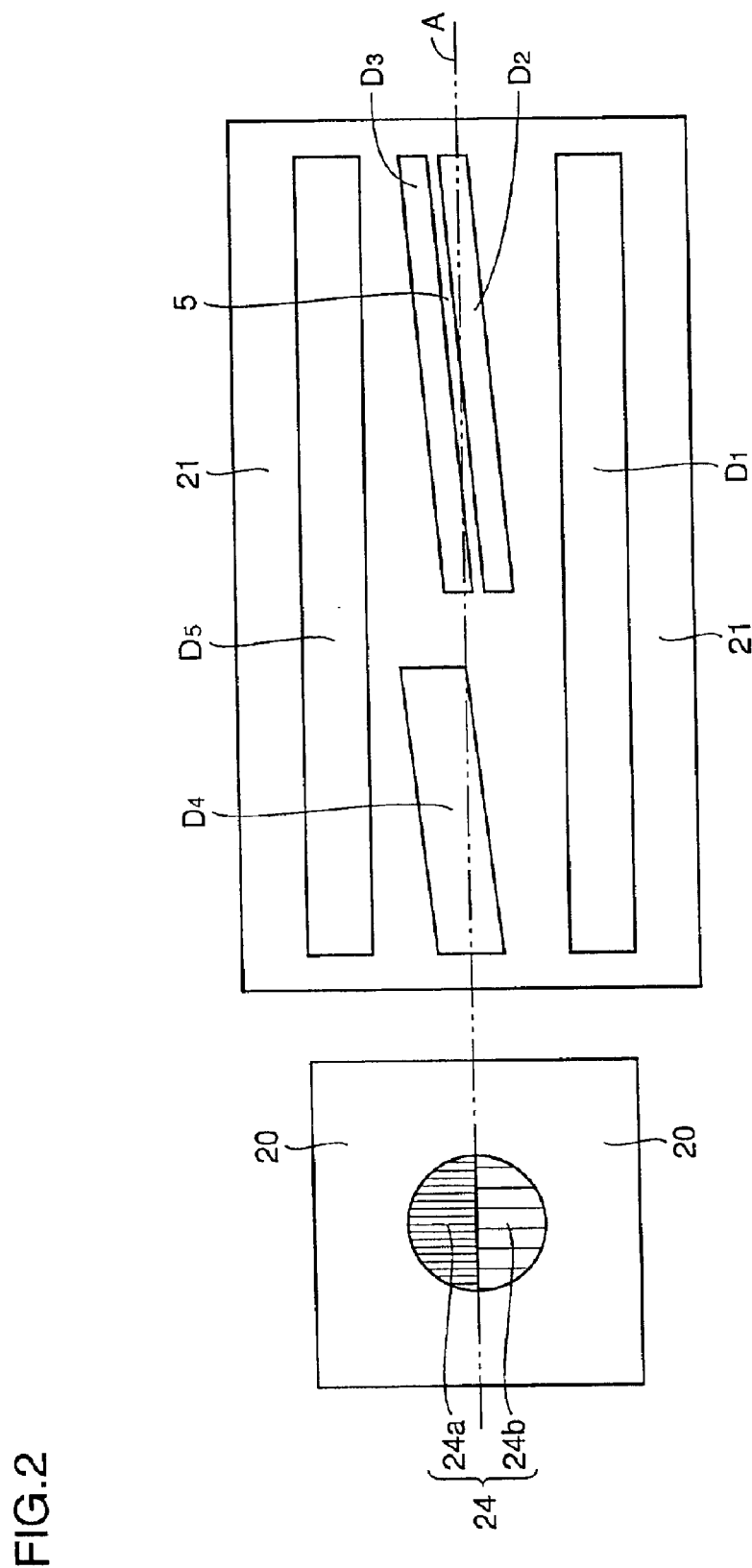
FIG. 2 is a top plan view showing the signal light diffraction grating and the light receiving portion of the semiconductor laser device shown in FIGS. 1A and 1B.

FIG. 2 shows signal light diffraction grating 24 and light receiving portion 21 in two dimensions. Signal light diffraction grating 24 is formed of a fine grating 24a (a second diffraction grating) having a small diffraction groove pitch, and a coarse grating 24b (a first diffraction grating) having a large diffraction groove pitch. Light receiving portion 21 is provided with two tracking error detecting photodiodes D1 and D5, focus error detecting photodiodes D2 and D3 separated from each other by a parting line (or a gap) 5, and a regenerative signal detecting photodiode D4. The light receiving portion is arranged such that its longitudinal direction is in parallel with an imaginary line A that is orthogonal to the diffraction grooves of signal light diffraction grating 20. Here, imaginary line A can be considered to be orthogonal to the diffraction grooves of either the fine grating 24a or the coarse grating 24b, since the diffraction grooves of the two gratings 24a and 24b extend in a common direction. As the light receiving portion receives the light diffracted by the diffraction grating, it is natural that imaginary line A macroscopically extends in almost the same direction as the diffraction direction.

Referring to FIG. 2, the zonal gap (or parting line) 5 has a slope upward to the right. More specifically, it has a slope directed from the coarse grating (first grating) side to the fine grating (second grating) side as it extends farther from signal light diffraction grating 24 along the longitudinal direction of focus error detecting photodiodes D2 and D3. This slope corresponds to the slope of the locus that the beam spot follows when tracking beam generating diffraction grating 23 and signal light diffraction grating 24 deflect the beam due to the change in wavelength attributable to the temperature change. By aligning parting line 5 as the zonal gap with the locus of the beam spot, it is possible to prevent the spot from deviating to either focus error detecting photodiode D2 or D3, and hence to suppress the focus error. Although this slope typically falls in a range between 10 mrad and 20 mrad, it may be larger or smaller than this range.

Focus error detecting photodiodes D2 and D3 including gap 5 therebetween form a parallelogram, with its short side being parallel to the short side of the outer shape of light receiving portion 21, and hence, orthogonal to imaginary line A. Such an arrangement as the parallelogram makes it possible to form focus error detecting photodiodes D2 and D3 of a short length, thereby enabling downsizing of the light receiving portion. If regenerative signal detecting photodiode D4 is made of a parallelogram having the same slope as the parallelogram of focus error detecting photodiodes D2 and D3, further downsizing of the light receiving portion is possible. Regenerative signal detecting photodiode D4 and focus error detecting photodiodes D2, D3 are each arranged such that it can cover, with a required minimum size especially in the longitudinal direction, the range in which the spot being formed by the corresponding beam would move in a working temperature range. Accordingly, despite the small sizes, they can reliably obtain the respective signals even if a temperature change occurs. Since the long sides of two tracking signal detecting photodiodes D1 and D5 are parallel to the long side of the outer shape of the light receiving portion, pattern formation of the photodiodes is simple.

Figure 3:
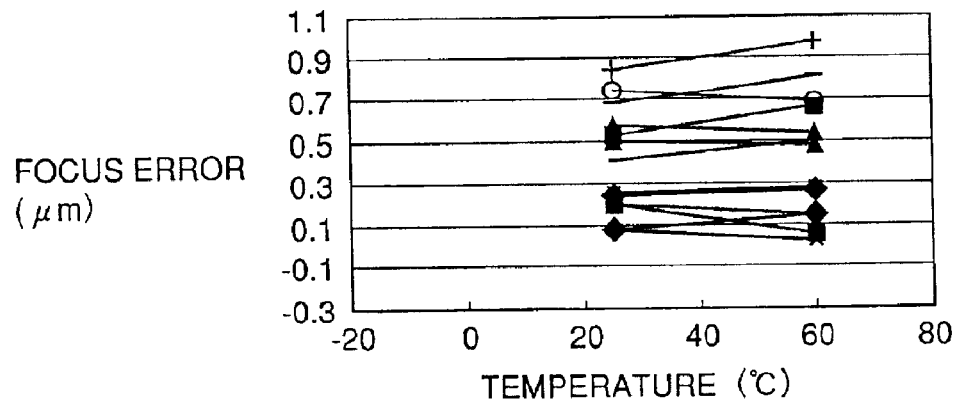
FIG. 3 shows focus errors with respect to temperature changes in the case where the semiconductor laser device of the embodiment of the present invention is employed.
Figure 7:
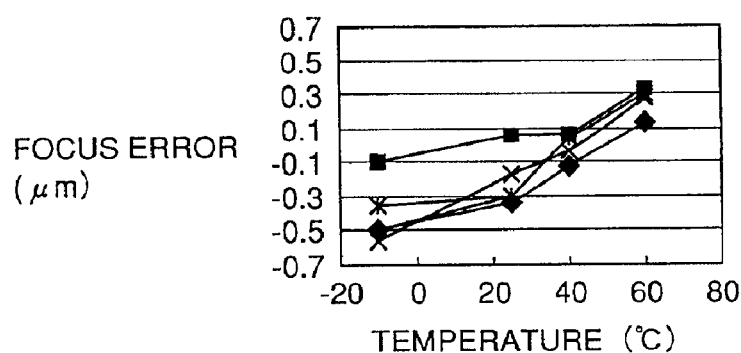
FIG. 7 shows the focus errors with respect to temperature changes in the case of the light receiving portion arranged as shown in FIG. 6A.

FIG. 3 shows results of measurement of the focus errors with respect to temperature changes in the case where a semiconductor laser device having the light receiving portion as shown in FIG. 2 is employed. In FIG. 3, the focus errors due to the temperature changes are far less obvious than in the case of FIG. 7 where the conventional semiconductor laser device is used, and thus, it is appreciated that the temperature-dependent characteristic of the focus error is considerably improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor laser device, comprising:
a semiconductor laser chip emitting a laser light;
a tracking beam generating diffraction grating for diffracting said laser light to generate a tracking beam;
a signal light diffraction grating for diffracting a signal light being said laser light reflected from an optical disc, said signal light diffraction grating including a first diffraction grating having diffraction grooves of a pitch and a second diffraction grating having diffraction grooves of another pitch that is smaller than the pitch of the diffraction grooves of the first diffraction grating, the diffraction grooves of said first and second diffraction gratings extending in a common direction, and said first and second diffraction gratings being arranged adjacent to each other with a portion extending in a direction orthogonal to the common direction of the diffraction grooves interposed therebetween; and a light receiving portion having a pair of focus error detecting photodiodes extending as two strips with a parting portion as a zonal gap interposed therebetween for receiving, among a plurality of beams diffracted by said signal light diffraction grating, a focus error detecting beam diffracted by said second diffraction grating, said light receiving portion having a longitudinal direction arranged, as seen in two dimensions, orthogonal to the direction of the diffraction grooves of said signal light diffraction grating, said parting portion being sloped, as seen in two dimensions, from the first diffraction grating side to the second diffraction grating side as a distance from said signal line diffraction grating increases, wherein the plurality of beams diffracted by said signal light diffraction grating includes a track signal detecting beam and said light receiving portion further includes a track signal detecting photodiode for receiving the track signal detecting beam, the track signal detecting photodiode having a longitudinal direction orthogonal to the direction of the diffraction grooves of said signal light diffraction grating as seen in two dimensions, and the plurality of beams diffracted by said signal light diffraction grating further includes a regenerative signal detecting beam and said light receiving portion further includes a regenerative signal detecting photodiode for receiving the regenerative signal detecting beam, the regenerative signal detecting photodiode being a parallelogram, as seen in two dimensions, having a long side sloped in a same direction as a long side of said pair of focus error detecting photodiodes and a short side in parallel with the direction of the diffraction grooves of said signal light diffraction grating.

2. The semiconductor laser device according to claim 1, wherein said pair of focus error detecting photodiodes has an outer shape in two dimensions of a parallelogram having a long side parallel to a longitudinal direction of said parting portion and a short side parallel to the direction of the diffraction grooves of said signal light diffraction grating.

3. The semiconductor laser device according to claim 1, wherein said light receiving portion has another photodiode arranged such that, as seen in two dimensions, a longitudinal direction of said photodiode is orthogonal to the direction of the diffraction grooves of said signal light diffraction grating.

4. The semiconductor laser device according to claim 1, wherein said pair of focus error detecting photodiodes and said regenerative signal detecting photodiode include respective regions in which respective spots of said focus error detecting beam and said regenerative signal detecting beam move in a working temperature range.

5. An optical pickup apparatus for optically reading information written on an optical disc using the semiconductor laser device according to claim 1.

* * * * *